(12) United States Patent
Swanburg et al.

(10) Patent No.: US 9,350,842 B2
(45) Date of Patent: May 24, 2016

(54) DYNAMIC VOICEMAIL RECEPTIONIST SYSTEM

(75) Inventors: Scott Swanburg, Coral Springs, FL (US); Andre Okada, Seattle, WA (US); Paul Hanson, Kirkland, WA (US); Chris Young, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1422 days.

(21) Appl. No.: 12/053,525

(22) Filed: Mar. 21, 2008

(65) Prior Publication Data

US 2009/0022285 A1 Jan. 22, 2009

Related U.S. Application Data

(60) Provisional application No. 60/896,728, filed on Mar. 23, 2007.

(51) Int. Cl.
*H04M 11/00* (2006.01)
*H04M 1/2745* (2006.01)
(Continued)

(52) U.S. Cl.
CPC ... *H04M 1/274516* (2013.01); *H04L 29/12047* (2013.01); *H04L 29/12122* (2013.01); *H04L 29/12132* (2013.01); *H04L 51/28* (2013.01); *H04L 61/1547* (2013.01); *H04L 61/1552* (2013.01); *H04L 61/1594* (2013.01); *H04L 67/1095* (2013.01); *H04M 1/72572* (2013.01); *H04L 29/12169* (2013.01); *H04L 51/14* (2013.01); *H04L 61/1576* (2013.01); *H04M 1/274508* (2013.01); *H04M 3/42382* (2013.01);
(Continued)

(58) Field of Classification Search
CPC ...................................................... H04W 4/16
USPC .............. 379/88.19, 67.1; 455/414, 415, 413, 455/412.1, 414.1, 566
See application file for complete search history.

(56) References Cited

U.S. PATENT DOCUMENTS 4,930,077 A 5/1990 Fan
5,341,414 A 8/1994 Popke
(Continued)

FOREIGN PATENT DOCUMENTS

EP 1359777 11/2003
EP 1569426 8/2005
(Continued)

OTHER PUBLICATIONS

U.S. Official Action mailed on Feb. 27, 2013 in U.S. Appl. No. 12/279,756.
(Continued)

*Primary Examiner* — Khalid Shaheed
(74) *Attorney, Agent, or Firm* — Hartman & Citrin LLC

(57) ABSTRACT

A voicemail receptionist system includes a memory and a processor. The memory can store data relating to one or more users. An incoming communication can be handled by the voicemail receptionist system and provided with functionality based upon a user's preferences, for example. The data stored by the voicemail receptionist system can be updated at any time, or automatically updated upon updating of the data, or upon occurrence of a trigger event. Voicemail receptionist functionality can include standard voicemail system functionality as well as functionality relating to email, text messaging, MMS messaging, calendar features, schedule announcements, location data, as well as other features.

17 Claims, 10 Drawing Sheets

(51) Int. Cl.
*H04L 12/58* (2006.01)
*H04M 1/725* (2006.01)
*H04L 29/08* (2006.01)
*H04L 29/12* (2006.01)
*H04M 3/42* (2006.01)

(52) U.S. Cl.
CPC ... *H04M 2203/2011* (2013.01); *H04M 2250/10* (2013.01)

(56) References Cited

U.S. PATENT DOCUMENTS

| | | | |
|---|---|---|---|
| 5,371,673 | A | 12/1994 | Fan |
| 5,692,032 | A | 11/1997 | Seppanen et al. |
| 5,715,370 | A | 2/1998 | Luther et al. |
| 5,894,506 | A | 4/1999 | Pinter |
| 5,905,959 | A * | 5/1999 | Foladare et al. ............. 455/445 |
| 5,943,399 | A | 8/1999 | Bannister et al. |
| 6,044,275 | A | 3/2000 | Boltz et al. |
| 6,085,201 | A | 7/2000 | Tso |
| 6,138,008 | A * | 10/2000 | Dunn et al. ................. 455/417 |
| 6,182,059 | B1 | 1/2001 | Angotti et al. |
| 6,278,968 | B1 | 8/2001 | Franz et al. |
| 6,278,996 | B1 | 8/2001 | Richardson et al. |
| 6,356,633 | B1 | 3/2002 | Armstrong |
| 6,393,421 | B1 | 5/2002 | Paglin |
| 6,411,947 | B1 | 6/2002 | Rice et al. |
| 6,418,308 | B1 | 7/2002 | Heinonen et al. |
| 6,477,551 | B1 | 11/2002 | Johnson et al. |
| 6,480,484 | B2 * | 11/2002 | Morton ....................... 370/352 |
| 6,522,877 | B1 | 2/2003 | Lietsalmi et al. |
| 6,622,021 | B1 | 9/2003 | Takala |
| 6,718,367 | B1 | 4/2004 | Ayyadurai |
| 6,718,368 | B1 | 4/2004 | Ayyadurai |
| 6,938,068 | B1 | 8/2005 | Kraft et al. |
| 7,058,652 | B2 | 6/2006 | Czarnecki et al. |
| 7,137,070 | B2 | 11/2006 | Brown et al. |
| 7,149,782 | B2 | 12/2006 | Sommerer |
| 7,225,232 | B2 | 5/2007 | Elberse |
| 7,280,818 | B2 | 10/2007 | Clayton |
| 7,363,246 | B1 | 4/2008 | Van Horn et al. |
| 7,383,250 | B2 | 6/2008 | Scian et al. |
| 7,418,496 | B2 | 8/2008 | Macey et al. |
| 7,546,131 | B1 | 6/2009 | Sidi et al. |
| 7,552,178 | B2 | 6/2009 | Chen et al. |
| 7,619,584 | B2 | 11/2009 | Wolf |
| 7,650,157 | B2 | 1/2010 | Clayton |
| 7,657,250 | B2 | 2/2010 | Clayton |
| 7,657,600 | B2 | 2/2010 | Auhagen |
| 7,756,535 | B1 | 7/2010 | Diao et al. |
| 7,844,666 | B2 | 11/2010 | Horvitz et al. |
| 7,925,620 | B1 | 4/2011 | Yoon |
| 7,996,372 | B2 | 8/2011 | Rubel, Jr. |
| 8,069,143 | B2 | 11/2011 | Swanburg et al. |
| 8,078,978 | B2 | 12/2011 | Perry et al. |
| 8,249,920 | B2 | 8/2012 | Smith |
| 8,380,566 | B2 | 2/2013 | Smith |
| 8,396,450 | B2 | 3/2013 | Clayton |
| 8,645,468 | B2 | 2/2014 | O'Sullivan et al. |
| 8,849,730 | B2 | 9/2014 | Winn et al. |
| 8,893,023 | B2 | 11/2014 | Perry et al. |
| 8,954,510 | B2 | 2/2015 | Chen et al. |
| 2001/0041566 | A1 | 11/2001 | Xanthos et al. |
| 2002/0007346 | A1 | 1/2002 | Qiu et al. |
| 2002/0035684 | A1 | 3/2002 | Vogel et al. |
| 2002/0138582 | A1 | 9/2002 | Chandra et al. |
| 2002/0169841 | A1 | 11/2002 | Carlson et al. |
| 2002/0178041 | A1 | 11/2002 | Krantz et al. |
| 2003/0154256 | A1 | 8/2003 | Hadano et al. |
| 2003/0193951 | A1 | 10/2003 | Fenton et al. |
| 2004/0052342 | A1 | 3/2004 | Jugovec et al. |
| 2004/0059700 | A1 | 3/2004 | Park et al. |
| 2004/0128151 | A1 | 7/2004 | Mock et al. |
| 2004/0208297 | A1 * | 10/2004 | Valentine ................... 379/88.19 |
| 2004/0230689 | A1 | 11/2004 | Loveland |
| 2005/0021551 | A1 | 1/2005 | Silva et al. |
| 2005/0021636 | A1 | 1/2005 | Kumar |
| 2005/0074169 | A1 | 4/2005 | Filatov et al. |
| 2005/0076110 | A1 | 4/2005 | Mathew et al. |
| 2005/0120084 | A1 | 6/2005 | Hu et al. |
| 2005/0198582 | A1 | 9/2005 | Hennum et al. |
| 2005/0199714 | A1 | 9/2005 | Brandt et al. |
| 2005/0209861 | A1 | 9/2005 | Hewes et al. |
| 2006/0030297 | A1 | 2/2006 | Coble et al. |
| 2006/0052091 | A1 | 3/2006 | Onyon et al. |
| 2006/0095575 | A1 | 5/2006 | Sureka et al. |
| 2006/0104429 | A1 * | 5/2006 | Wouterse et al. .......... 379/210.01 |
| 2006/0115062 | A1 | 6/2006 | Gonder et al. |
| 2006/0149819 | A1 | 7/2006 | Auhagen |
| 2006/0167834 | A1 | 7/2006 | Rubel, Jr. |
| 2006/0168065 | A1 | 7/2006 | Martin |
| 2006/0205416 | A1 | 9/2006 | Kayzar |
| 2006/0246881 | A1 * | 11/2006 | Winkler et al. ............... 455/415 |
| 2006/0250987 | A1 | 11/2006 | White et al. |
| 2006/0253537 | A1 | 11/2006 | Thomas |
| 2006/0274721 | A1 | 12/2006 | Flanagan |
| 2006/0277139 | A1 | 12/2006 | Poltorak |
| 2006/0277176 | A1 | 12/2006 | Liao |
| 2007/0022099 | A1 | 1/2007 | Yoshimura et al. |
| 2007/0026852 | A1 * | 2/2007 | Logan et al. ............... 455/422.1 |
| 2007/0038942 | A1 | 2/2007 | Chen et al. |
| 2007/0064920 | A1 | 3/2007 | Ruckart |
| 2007/0088798 | A1 | 4/2007 | Merrill et al. |
| 2007/0100631 | A1 | 5/2007 | Bodin et al. |
| 2007/0136431 | A1 | 6/2007 | Sun |
| 2007/0155411 | A1 | 7/2007 | Morrison |
| 2007/0233736 | A1 | 10/2007 | Xiong et al. |
| 2007/0249379 | A1 | 10/2007 | Bantukul |
| 2007/0266118 | A1 | 11/2007 | Wilkins |
| 2007/0266156 | A1 | 11/2007 | Wilkins |
| 2007/0288576 | A1 | 12/2007 | Illg |
| 2008/0004005 | A1 * | 1/2008 | Jensen ......................... 455/431 |
| 2008/0046807 | A1 | 2/2008 | Margitich et al. |
| 2008/0077468 | A1 | 3/2008 | Raskin |
| 2008/0109735 | A1 | 5/2008 | Vuong |
| 2008/0133677 | A1 | 6/2008 | Pattabhiraman et al. |
| 2008/0189293 | A1 | 8/2008 | Strandel et al. |
| 2008/0235242 | A1 | 9/2008 | Swanburg et al. |
| 2008/0250332 | A1 | 10/2008 | Farrell et al. |
| 2008/0300982 | A1 | 12/2008 | Larson et al. |
| 2009/0282114 | A1 | 11/2009 | Feng et al. |
| 2009/0285129 | A1 | 11/2009 | Swanburg et al. |
| 2010/0179991 | A1 | 7/2010 | Lorch et al. |
| 2010/0287241 | A1 | 11/2010 | Swanburg et al. |
| 2012/0066177 | A1 | 3/2012 | Swanburg et al. |
| 2012/0089925 | A1 | 4/2012 | Perry et al. |
| 2012/0166561 | A1 | 6/2012 | Kelly |

FOREIGN PATENT DOCUMENTS

| | | |
|---|---|---|
| EP | 1755294 | 2/2007 |
| EP | 1918825 | 5/2008 |
| WO | 9949679 | 9/1999 |
| WO | 02087197 | 10/2002 |
| WO | 2005015927 | 2/2005 |
| WO | 2008/118878 | 10/2008 |

OTHER PUBLICATIONS

U.S. Office Action dated Jul. 16, 2010 in U.S. Appl. No. 12/051,336.
U.S. Office Action dated Dec. 17, 2010 in U.S. Appl. No. 12/051,336.
U.S. Notice of Allowance dated Jul. 15, 2011 in U.S. Appl. No. 12/051,336.
U.S. Office Action dated Dec. 7, 2009 in U.S. Appl. No. 11/873,031.
U.S. Office Action dated May 26, 2010 in U.S. Appl. No. 11/873,031.
U.S. Office Action dated Feb. 16, 2012 in U.S. Appl. No. 11/873,031.
U.S. Office Action dated Jul. 25, 2012 in U.S. Appl. No. 11/873,031.
U.S. Office Action dated Dec. 23, 2010 in U.S. Appl. No. 12/279,756.
U.S. Office Action dated Jul. 8, 2011 in U.S. Appl. No. 12/279,756.
U.S. Office Action dated Sep. 15, 2010 in U.S. Appl. No. 12/053,512.
U.S. Office Action dated Mar. 1, 2011 in U.S. Appl. No. 12/053,512.
U.S. Office Action dated Jul. 6, 2011 in U.S. Appl. No. 12/053,512.
U.S. Office Action dated Feb. 9, 2012 in U.S. Appl. No. 12/053,512.

(56) References Cited

OTHER PUBLICATIONS

U.S. Office Action dated Oct. 12, 2012 in U.S. Appl. No. 12/053,512.
Pearlman, L., "A Community Authorization Service for Group Collaboration," Jun. 2002, IEEE 3rd International Workshop, pp. 50-59.
"3rd Generation Partnership Project; Technical Specification Group Services and System Aspects; Support of SMS and MMS Over Generic 3GPP TR Access," 3GPP TR 23.804 v7.1.0 (Sep. 2005).
U.S. Appl. No. 12/279,756 Office Action dated Sep. 11, 2013.
U.S. Appl. No. 13/296,374 Office Action dated Nov. 25, 2013.
U.S. Appl. No. 12/279,756 Office Action dated Apr. 8, 2014.
International Application No. PCT/US2008/058052 Written Opinion dated Sep. 29, 2009.
International Application No. PCT/US2008/058052 International Search Report dated Oct. 7, 2008.
International Application No. PCT/US2008/058055 Written Opinion dated Sep. 29, 2009.
International Application No. PCT/US2008/058055 International Search Report dated Jul. 3, 2009.
International Application No. PCT/US2008/058057 Written Opinion dated Sep. 29, 2009.
International Application No. PCT/US2008/058057 International Search Report dated Jul. 7, 2008.
International Application No. PCT/US2008/058064 Written Opinion dated Sep. 29, 2009.
International Application No. PCT/US2008/058064 International Search Report dated Aug. 21, 2008.
International Application No. PCT/US2008/058067 Written Opinion dated Sep. 29, 2009.
International Application No. PCT/US2008/058067 International Search Report dated Oct. 27, 2008.
Office Action mailed Oct. 21, 2014, in U.S. Appl. No. 12/279,756.
Office Action mailed Mar. 30, 2015 in U.S. Appl. No. 12/279,756.
U.S. Office Action mailed Jan. 27, 2015 in U.S. Appl. No. 13/296,374.
Office Action mailed May 11, 2015 in U.S. Appl. No. 14/669,372.
Notice of Allowance mailed Aug. 24, 2015 in U.S. Appl. No. 12/279,756.
Office Action mailed Sep. 15, 2015 in U.S. Appl. No. 14/669,372.

* cited by examiner

DYNAMIC VOICEMAIL RECEPTIONIST SYSTEM

RELATED APPLICATION

This application claims priority to U.S. Provisional Application No. 60/896,728, filed Mar. 23, 2007, the entirety of which is hereby incorporated by reference.

TECHNICAL FIELD

The present disclosure relates generally to voicemail platforms for communications devices. More particularly, the present disclosure relates to a dynamic voicemail receptionist system for communications networks.

BACKGROUND

Voicemail is a popular telephone service feature, whether the telephone is standard wired telephone service, wireless, e.g., cellular, telephone service, or even voice over internet protocol (VoIP). When a dialed line does not answer or is busy, a call can be handled by a voicemail system. A voicemail system often plays a recording for a calling party and prompts the calling party to leave a brief message, for example, a spoken message. The message is often recorded and stored until the message is retrieved by a voicemail user.

Statistics suggest that there are close to 100 million cell phone users in the United States. A recent trend in the U.S. includes replacing terrestrial telephone services with cellular telephone services, meaning that a cellular telephone service may be a user's only telephone number. As such, voicemail, an almost standard feature for cellular telephone service, is relied upon by many users to report all missed telephone calls. With the increased reliance upon cellular telephone service has come a corresponding increased reliance upon other cellular telephone features, for example, text messaging, which allows exchange of short strings of text between users without initiating a telephone call. Text messages can be useful for delivering short messages that require no response from the message recipient, for example, "I'm on Flight 1234, arriving at 9:05 PM at Gate 1D." As reliance upon cellular telephone services and voicemail increases, demand for enhanced voicemail services will likely experience a corresponding increase.

SUMMARY

A voicemail receptionist system can include a memory configured to store user data associated with at least one user. The memory can also store instructions for handling a communication. The voicemail receptionist system can also include a processor operably connected to the memory. The processor is configured to determine how to handle a communication based upon the user data and the instructions stored in the memory. The user data can include any combination of data, including, but not limited to, user preferences, calendar data, audio data, location data, network data, and device and/or account data. Instead of, or in addition to, using the user data, the voicemail receptionist system can also receive data relating to an incoming call. The determination as to how to handle a communication can be based upon the incoming call data as well as, or instead of, the user data. The voicemail receptionist system can also include a communications network interface. The communications network interface can be a wireless and/or wired connection. If the voicemail receptionist system resides on a mobile communications device, the communications network interface can include a device antenna.

A method for handling a call with a voicemail receptionist system can include obtaining user data associated with at least one user. The data can be updated at any time. The voicemail receptionist system can receive, from a calling party, a call for a user. The voicemail receptionist system can analyze the user data and the data relating to the received call to determine menu options for presentation to the calling party. If there are menu options to present to the calling party, the voicemail system can present the options to the calling party. If there are no options to present to the calling party, the voicemail receptionist system can provide standard voicemail functionality to the calling party, can terminate the call, or can forward to the call to another node, platform, number, or the like. A calling party can select a desired menu option. The voicemail receptionist system can implement the selected option. If desired, the voicemail receptionist system can validate the selected option prior to attempting to implement the option. In some embodiments, the selected option may require data that is not yet known by the voicemail receptionist system. Alternatively, the selected option may be directed to dynamic information. The voicemail receptionist system can update any information at any time, including after selection of a menu option, to improve the accuracy of the information requested by the calling party.

In some embodiments, the method includes storing the obtained user data in a memory. In some embodiments, the menu options are provided as an audio menu and the calling party can select an option using voice commands and/or pressing a keypad button to send a DTMF tone to the voicemail receptionist system. In some embodiments, the menu options are presented by transmitting data to the calling party device with instructions for formatting and displaying a menu to the calling party. When a calling party makes a selection, the voicemail receptionist system can receive data from the calling party device indicating the menu option selection.

The voicemail receptionist system can determine that an additional selection is available after the first selection. The method can therefore include presenting additional menu options to a calling party and receiving an additional menu option selection from the calling party. The received additional menu option can be executed by the voicemail receptionist system, with or without validation by the voicemail receptionist system of the first and/or additional menu option selections. If the menu option selected is available, the voicemail receptionist system can execute the selection. If the menu option selected is not available, then menu options can be presented to the calling party. The menu options can be new menu options or the same menu options already presented to the calling party.

A mobile device with a voicemail receptionist system can include a memory configured to store menu data associated with at least one menu option. The memory can also be configured to store instructions for presenting a menu. The device can also include a processor operably connected to the memory. The processor can be configured to determine how to present, to a calling party, at least one menu option based upon the instructions and the menu data. In some embodiments, the at least one menu option is based upon user data associated with a called user. The menu options can include one or more of an option to send a text message, an option to send a voicemail message, an option to listen to a schedule associated with the called user, and an option to send contact information relating to the calling party to the called user. The user data associated with a called user can be received over a communications network.

These and additional features of the present disclosure will become apparent with reference to the attached drawings, wherein:

DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
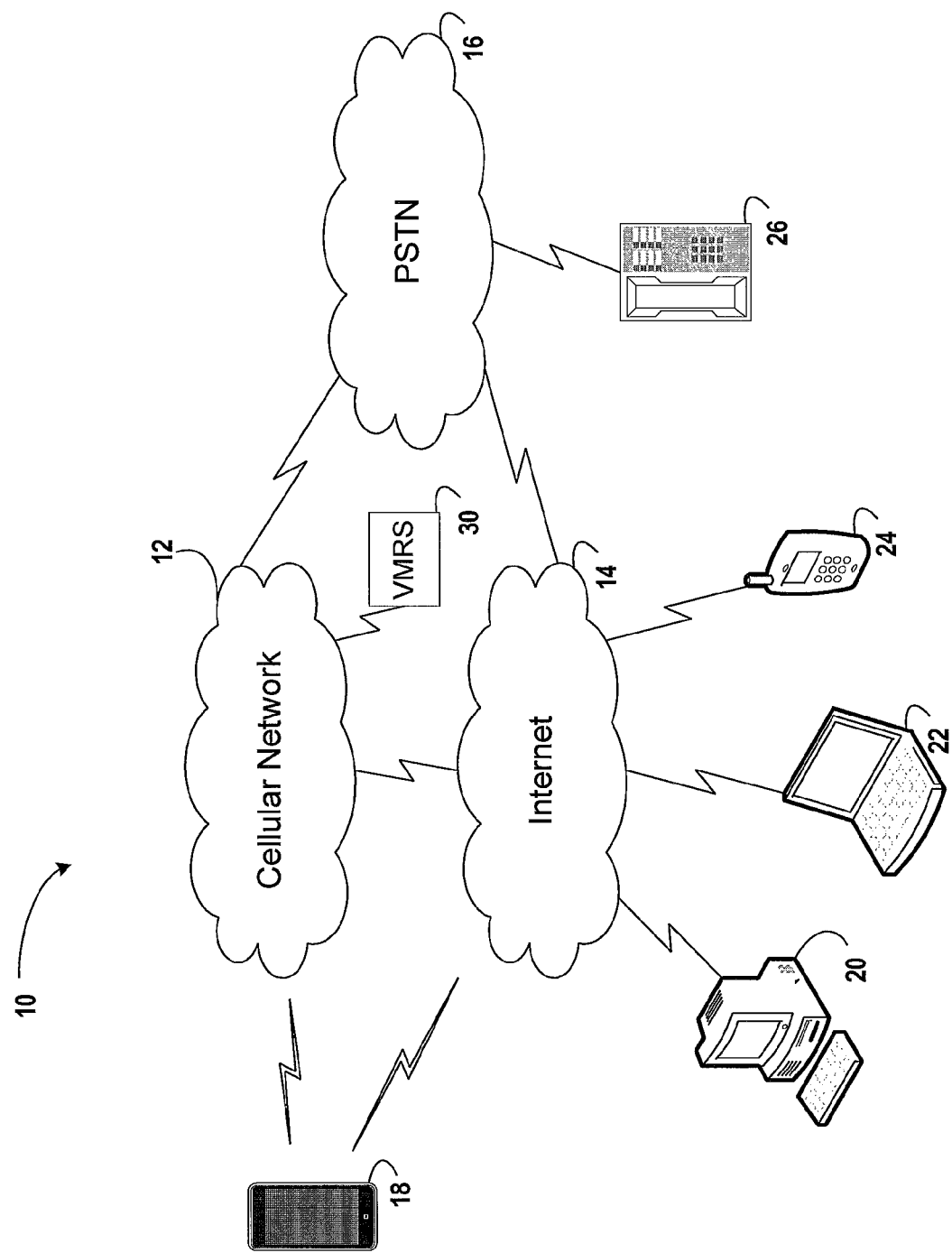
FIG. 1 schematically illustrates an exemplary communications network with which the present disclosure can be implemented.

Referring now to the drawings in which like numerals represent like elements throughout the several views, FIG. 1 schematically illustrates an exemplary communications network 10. The illustrated exemplary network 10 includes a cellular network 12, the Internet 14, and a PSTN 16. The cellular network 12 can include various components such as, but not limited to, base transceiver stations (BTSs), mobile switching centers (MSCs), short message service centers (SMSCs), multimedia messaging service centers (MMSCs), home location registers (HLRs), charging platforms, traditional voicemail platforms, GPRS core network components, and the like. A mobile device 18, for example, a cellular telephone, can be operatively connected to the cellular network 12. By way of example, the cellular network 12 can be configured as a 2G GSM (Global System for Mobile communications) network and provide data communications via GPRS (General Packet Radio Service), and EDGE (Enhanced Data rates for GSM Evolution). By way of further example, the cellular network 12 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The cellular network 12 is also compatible with future mobile communications standards including, but not limited to, pre-4G and 4G, for example. The illustrated cellular network 12 is shown in communication with the Internet 14 and the PSTN 16, though it will be appreciated that this is not necessarily the case.

One or more Internet-capable devices, for example, a PC 20, a laptop 22, and a portable device 24, can communicate with one or more cellular networks 12, or even a device 18 connected thereto, through the Internet 14. It will also be appreciated that the PC 20, the laptop 22, the portable device 24, or any other device, can communicate with the Internet 14 through the PSTN 16, the cellular network 12, or both. As illustrated, a communications device 26, for example, a telephone, can be in communication with the PSTN 16.

The cellular network 12 can include a wide array of nodes, devices, subsystems, networks, and subnetworks. For example, a cellular network 12 can include one or more messaging systems or nodes, for example, a short message service center (SMSC), a multimedia message service center (MMSC), voicemail systems, and the like. A cellular network 12 can also include various radios and nodes for passing voice, data, and combinations thereof to and from radio transceivers, networks, and the Internet 14. As illustrated, a communications network 10 can include a voicemail receptionist system 30 (VMRS). The VMRS 30 can be hardware, software, and/or a combination thereof. While the VMRS 30 is illustrated as being in communication with the cellular network 12, it will be appreciated that the VMRS 30 can be hardware and/or software residing on the cellular network 12, the PSTN 16, the portable device 18, the Internet 14, or a combination thereof, and can be accessible by and/or through multiple devices and networks. Furthermore, the VMRS 30 can reside on a private network accessible by the cellular network 12, the PSTN 16, or the Internet 14, or even the portable device 18. It should be appreciated that substantially all of the functionality ascribed to the communications network 10 can be performed by the cellular network 12.

Figure 2:
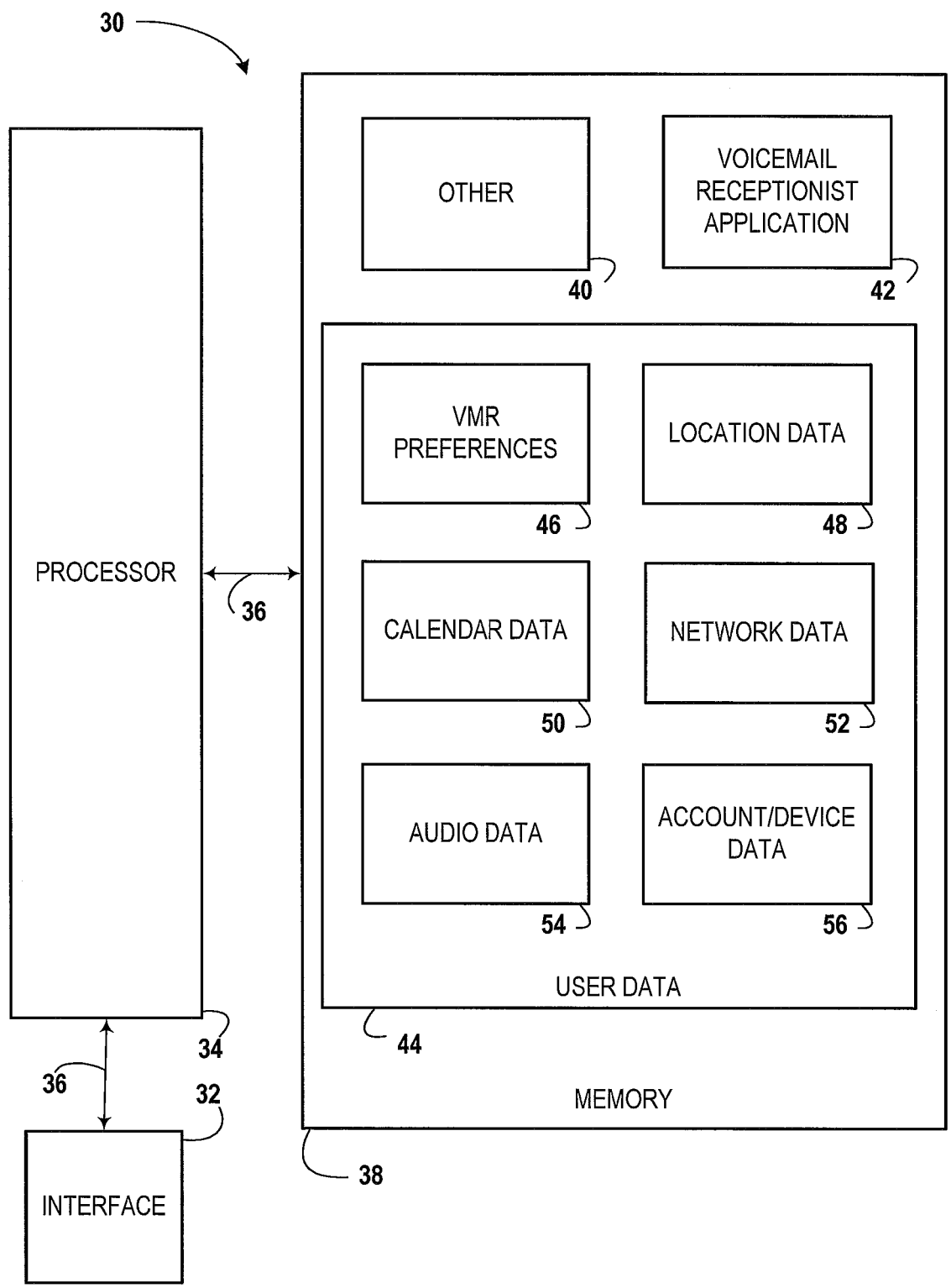
FIG. 2 schematically illustrates a voicemail receptionist system according to an exemplary embodiment of the present disclosure.

Turning now to FIG. 2, a schematic block diagram of an exemplary VMRS 30 is illustrated according to an exemplary embodiment of the present disclosure. The illustrated VMRS 30 includes a communications network interface 32 that is operatively linked and in communication with a processor 34 via a data/memory bus 36. The communications network interface 32 allows the VMRS 30 to communicate with one or more components of the communications network 10, or any device connected thereto or residing thereon. It will be appreciated that if the VMRS 30 resides on a device, for example, the device 18, that the communications network interface 32 can be a communications component of the device, for example, a transceiver, receiver, transmitter, antennae, or a combination thereof. The processor 34 is operatively linked and in communication with a memory 38 via a data/memory bus 36.

The word "memory," as used herein to describe the memory 38, collectively refers to all memory types associated with the VMRS 30 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 38 is illustrated as residing proximate the processor 34, it should be understood that the memory 38 can be a remotely accessed storage system, for example, a server on the Internet 14. Moreover, the memory 38 is intended to encompass network memory and/or other storage devices in wired or wireless communication with the VMRS 30, which may utilize the communications network interface 32 to facilitate such communication. Thus, any of the data, applications, and/or software described below can be stored within the memory 38 and/or accessed via network connections to other data processing systems (not shown) that may include a local area network (LAN), a metropolitan area network (MAN), or a wide area network (WAN), for example. Accordingly, the present disclosure may operate on the VMRS 30, wherein the VMRS 30 is configured as a server to one or more client data processing systems as dictated by a client/server model.

The illustrated memory 38 can include other elements 40, for example, other data, software, instructions, applications, and the like, and a voicemail receptionist application 42 (VMRA). The illustrated memory 38 can also include an operating system (not illustrated) and user data 44.

The user data 44 can include a number of categories of user data. The user data 44 can be associated with one or more users of the VMRS 30. Exemplary categories of user data 44 can include, for example, voicemail receptionist preferences data 46, location data 48, calendar data 50, network data 52, audio data 54, account/device data 56, and other data (not illustrated). The user data 44 can be configured, stored, synced, updated, and deleted by any number of users, network operators, or other authorized parties. The user data 44 can be entered into any device, including, but not limited to, a device 18, a PC 20, a laptop 22, a portable device 24, or a server on the Internet 14. Additionally, or in the alternative, the VMRS 30 can include functionality that enables a user to enter user data 44 directly into the VMRS memory 38.

Preferences data 46 can include the user's preferences for the VMRS 30. Preferences data 46 can include an indication as to which functions the user wishes to make available to calling parties. For example, the preferences data 46 can indicate whether the user wishes to share location data, whether the user wishes to share calendar data, if the user wishes to allow calling parties to send voicemail, text, or email messages, and if the user accepts contact information from calling parties. Other preferences are possible, including options for bypassing the VMRS 30 and sending incoming calls for a user to another system, phone number, and/or user, forwarding numbers, voice or data delivery options, including formats, size, delivery times, and the like, as well as other preferences.

Location data 48 can include the user's location at any particular time. The location data 48 can be obtained from any suitable device or means, including, but not limited to, manual entry by the user of the user's location, from a presence indication provided by, for example, the user's schedule, from the user's device, from a location server, or by using GPS, cellular and/or Wi-Fi triangulation data, or the like to determine the user's location. The location data 48 can be updated constantly, at predetermined intervals, by the user, or automatically, for example, when a call is received from a party with which the user wishes to share location data 48.

Calendar data 50 can include information relating to the user's calendar for any time or time frame. For example, the calendar data 50 can include data indicating a user's appointments, free time, busy time, vacation time, and the like. As such, at any particular time, the calendar data 50 can provide the VMRS 30 with data relating to the user's calendar, or a portion thereof, which the VMRS 30 can pass to the calling party. Additionally, or in the alternative, the calendar data 50 can include a user's schedule for any time or time frame, which can be stored as data or even as an audio announcement providing details relating to the user's schedule. In one embodiment, a user can record a message conveying a schedule for a party, for example, the user's schedule. In another embodiment, a software and/or hardware device or application can create an audio announcement that conveys a party's schedule. If the calendar data 50 is an audio announcement, it can be stored as audio data 54.

Network data 52 can include data relating to the user's network, for example, network configuration and protocols. The network data 52 can provide any level of detail relating to the user's network. The network data 52 can be used to determine compatibility with a calling party device, network, and the like. The network data 52 can also detail restricted and/or allowed networks, for example, cellular networks, roaming data, Wi-Fi hotspots, VPNs, and the like. Restricted and/or allowed networks can be set by a user, by a network provider, or by any other authorized party. The network data 52 can be particularly useful if the VMRS 30 resides on the device 18, since this can allow the device 18 to format data or voice, for example, to enhance or optimize performance on the network.

Audio data 54 can include greetings, announcements, audio schedules, busy tones, ring tones, ringback tones, and the like. The audio data 54 can be configured by the user, the network, the VMRS 30, or any other authorized party or device. In some embodiments, the user calendar data 50 is converted to schedule announcements that are presented to a calling party as an audio file. In some embodiments, the user records a schedule announcement, for example, "I'm in the office today from 9:00 AM to 5:00 PM . . ." Greetings can also be tailored by the user or the VMRS 30 to indicate that a user is unavailable, or that the call has otherwise been forwarded to a voicemail system or VMRS 30. Audio data 54 can be stored in any desired format, including, but not limited to, WAV, AIFF, RAW, encoded in GSM CODEC, AAC, MP3, MP4, WMA, RA, MSV, DVF, and other open and proprietary audio formats.

Account/device data 56 can include data relating to the user's account and/or device, including, but not limited to, the user's subscription plan and the user's device capabilities. For example, the VMRS 30 can be in communication with one or more billing platforms, subscriber databases, other network nodes, and the like, to receive the account/device data 56 relating to a user's subscription plan, usage, and billing information. Additionally, the account/device data 56 can inform the VMRS 30 of the features the user's device supports by indicating the IMEI, serial number, carrier, software version(s), firmware, carrier-specific applications, combinations thereof, or the like. The account/device data 56 can pass-through the VMRS 30, or can be stored, at least temporarily. The VMRS 30 can use the account/device data 56 to determine what functionality should be provided to a calling party based upon what types of data and/or voice the user's device 18 can receive. If the user's device 18 does not support MMS messaging, for example, then the option to send an MMS message to the user can be disabled, if desired. Additionally, billing considerations can be used to tailor options presented to a calling party. For example, if the user has a 200 text message per month limit, then the VMRS 30 can, upon receiving a notification from a billing platform, disable the ability to send a text message through the VMRS 30 if the user has already exceeded the 200 text message per month limit when the call is sent to the VMRS 30. Additionally, or in the alternative, a notification can be sent from a billing platform to the user, and the user can manually deactivate the text message feature or override deactivation of the text message feature.

The VMRS 30 can identify any user data 44 as relating to a user, for example by correlating a calling or called party with the user data 44. Correlated user data 44 can thereby identify a user's preferences, location, calendar, recordings, greetings, schedules, announcements, network configuration, connection protocols, presence, device capabilities and characteristics, billing plan, other information, combinations thereof, and the like. Correlation of user data 44 will be described in more detail below with reference to FIG. 9.

Figure 3:
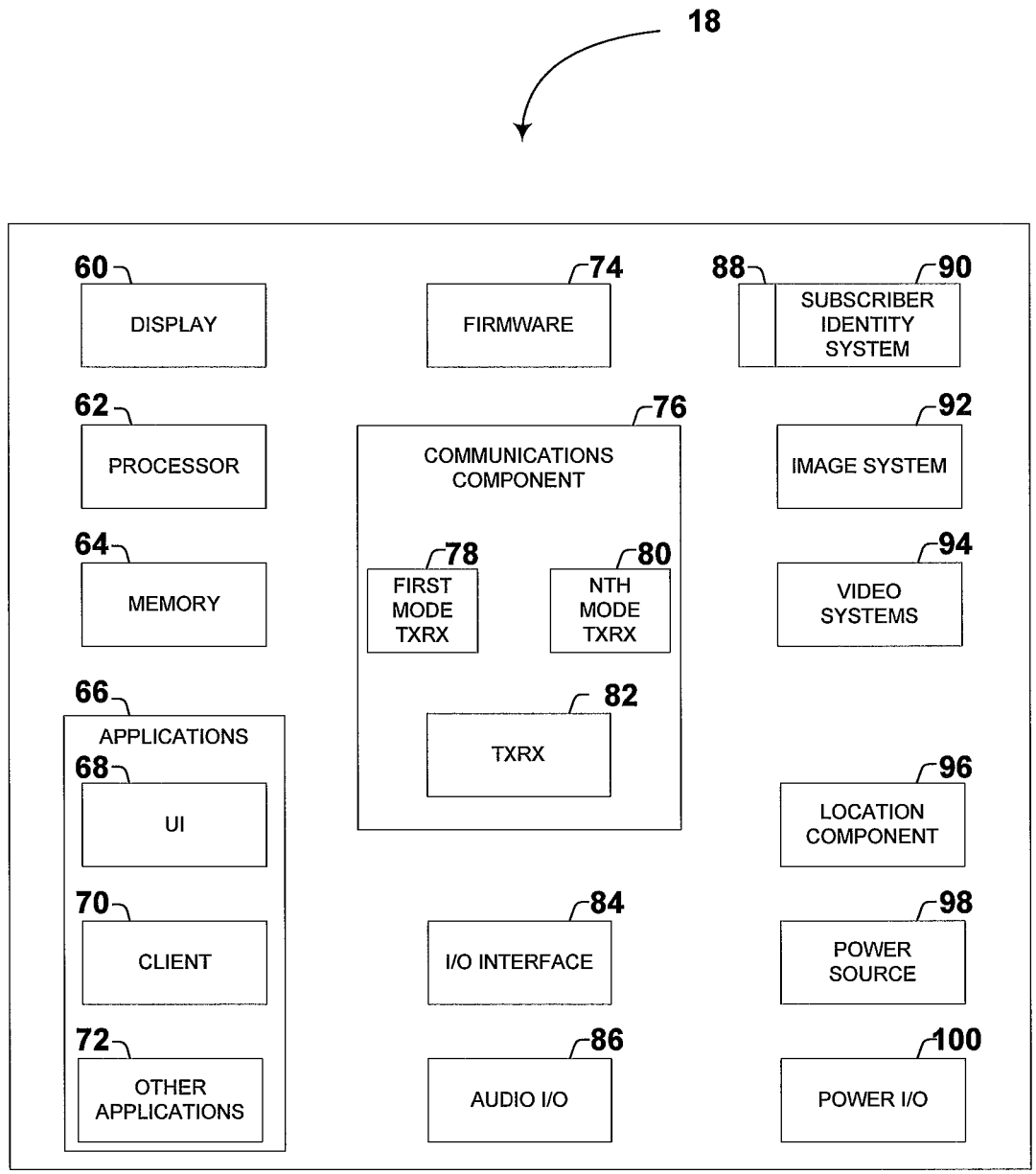
FIG. 3 schematically illustrates a block diagram of an exemplary mobile device suitable for implementing an embodiment of the present disclosure.

FIG. 3 illustrates a schematic block diagram of an exemplary mobile communications device 18 for use in accordance with an exemplary embodiment of the present disclosure. Although no connections are shown between the components illustrated in FIG. 3, the components can interact with each other to carry out device functions.

As illustrated, the mobile communications device 18 can be a multimode handset. FIG. 3 and the following discussion are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software. The term "applications" is used herein, and can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 18 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 18.

The device 18 can include a display 60 for displaying multimedia such as, for example, text, images, video, telephony functions such as Caller ID data, setup functions, menus, music, metadata, messages, wallpaper, graphics, internet content, device status, preferences settings, map data, location data, and the like. The device 18 can include a processor 62 for controlling, and/or processing data. A memory 64 can interface with the processor 62 for the storage of data and/or applications 66. An application 66 can include, for example, video player software, voicemail receptionist software, calendar software, music player software, email software, messaging software, combinations thereof, and the like. The application 66 can also include a user interface (UI) application 68. The UI application 68 can interface with a client 70 (e.g., an operating system) to facilitate user interaction with device functionality and data, for example, answering/initiating calls, entering/deleting data, configuring settings, address book manipulation, multimode interaction, and the like. The applications 66 can include other applications 72 such as, for example, firmware, add-ons, plug-ins, voice recognition, call voice processing, voice recording, messaging, e-mail processing, video processing, image processing, music play, combinations thereof, and the like, as well as subsystems and/or components. The applications 66 can be stored in the memory 64 and/or in a firmware 74, and can be executed by the processor 62. The firmware 74 can also store code for execution during initialization of the device 18.

A communications component 76 can interface with the processor 62 to facilitate wired/wireless communications with external systems including, for example, cellular networks, VoIP networks, LAN, WAN, MAN, PAN, that can be implemented using Wi-Fi, Wi-Max, combinations and/or improvements thereof, and the like. The communications component 76 can also include a multimode communications subsystem for providing cellular communications via different cellular technologies. For example, a first cellular transceiver 78 can operate in one mode, for example, GSM, and an Nth transceiver 80 can operate in a different mode, for example UMTS. While only two transceivers 78, 80 are illustrated, it should be appreciated that a plurality of transceivers can be included. The communications component 76 can also include a transceiver 82 for unlicensed communications using technology such as, for example, WI-FI, WI-MAX, BLUETOOTH, infrared, IRDA, NFC, RF, and the like. The communications component 76 can also facilitate communications reception from terrestrial radio networks, digital satellite radio networks, Internet-based radio services networks, combinations thereof, and the like. The communications component 76 can process data from a network such as, for example, the Internet, a corporate intranet, a home broadband network, and the like, via an ISP, DSL provider, or broadband provider.

An input/output (I/O) interface 84 can be provided for input/output of data and/or signals. The I/O interface 84 can be a hardwire connection, such as, for example, a USB, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, monitor, display, LCD, combinations thereof, and the like.

Audio capabilities can be provided by an audio I/O component 86 that can include a speaker for the output of audio signals and a microphone to collect audio signals. The device 18 can include a slot interface 88 for accommodating a subscriber identity system 90 such as, for example, a SIM or universal SIM (USIM). The subscriber identity system 90 instead can be manufactured into the device 18, thereby obviating the need for a slot interface 88. The device 18 can include an image capture and processing system 92. Photos and/or videos can be obtained via an associated image capture subsystem of the image system 92, for example, a camera.

The device 18 can also include a video component 94 for processing, recording, and/or transmitting video content.

A location component 96, can be included to send and/or receive signals such as, for example, GPS data, triangulation data, combinations thereof, and the like. The device 18 can use the received data to identify its location or can transmit data used by other devices to determine the device 18 location. The device 18 can include a power source 98 such as batteries and/or other power subsystem (AC or DC). The power source 98 can interface with an external power system or charging equipment via a power I/O component 100.

Figure 4:
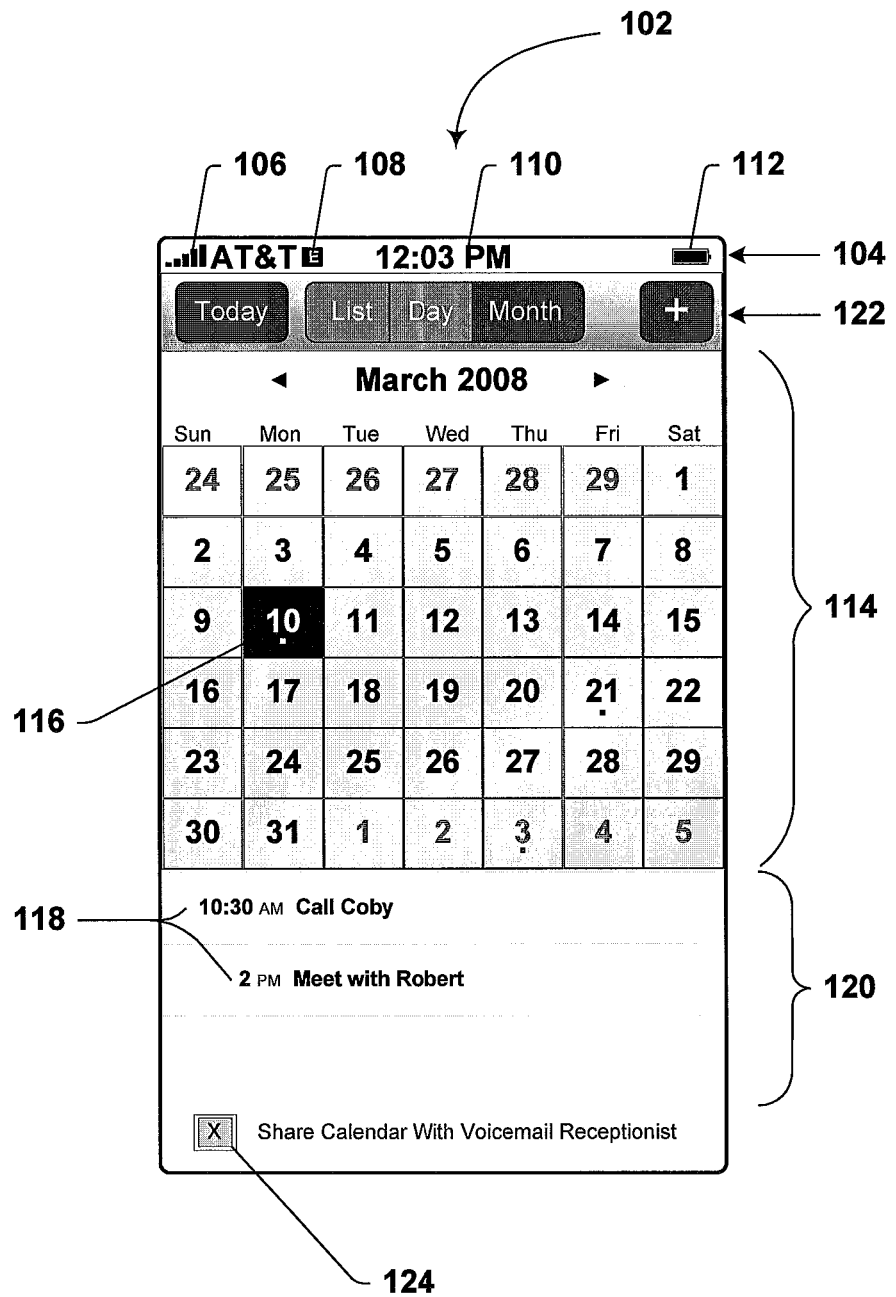
FIG. 4 illustrates an exemplary graphical user interface for allowing a user to configure calendar data, according to an exemplary embodiment of the present disclosure.

Turning now to FIG. 4, a representative image from a VMR GUI 102 is illustrated according to an exemplary embodiment of the disclosure. As illustrated, the GUI 102 can include device operational information 104, including, for example, a signal meter 106, an indication of the current network 108, the time of day 110, and a battery meter 112. Other indicators, including, but not limited to, a short range radio communications device indicator, an alarm indicator, and the like, can be included. In the illustrated GUI 102, a calendar 114 is currently displayed. In the illustrated calendar 114, a desired date 116 is highlighted, and associated action items 118 are listed below in the details section 120. In the illustrated details section 120, two items 118 are listed for the desired date 116. The illustrated GUI 102 also includes a menu portion 122, in which options relating to desired views, the date selection, and a new event creator, for example, are located. Additionally, the illustrated GUI 102 includes an option 124 for selecting whether the user's calendar data 50 will be shared with the VMRA 42.

Figure 5:
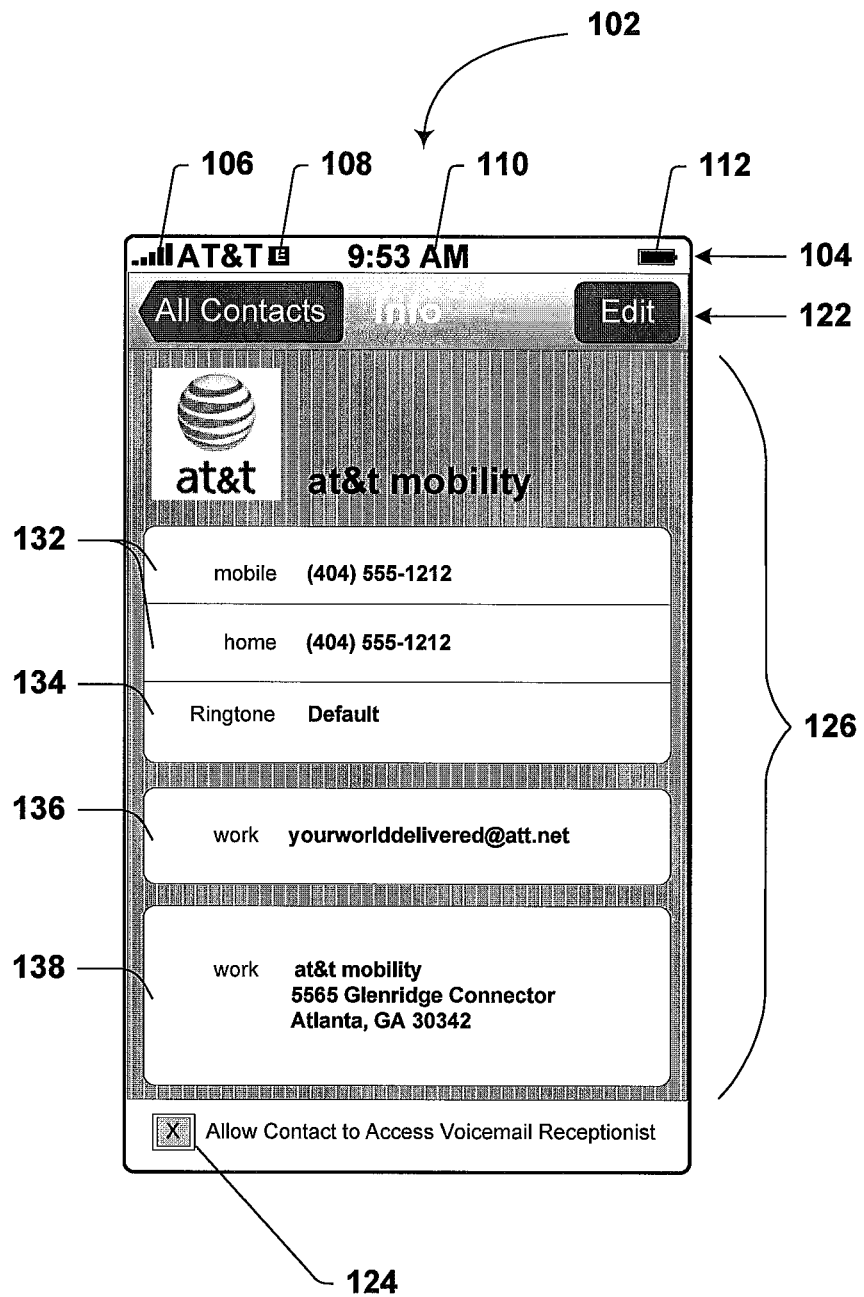
FIG. 5 illustrates an exemplary graphical user interface for allowing a user to configure contact information, according to an exemplary embodiment of the present disclosure.

Another exemplary GUI 102 image is illustrated in FIG. 5. In FIG. 5, exemplary contact information 126 associated with an exemplary contact is shown. In the illustrated exemplary GUI 102, the menu portion 122 includes an option to edit the contact information, and an option to return to the entire contact list. Some device interfaces allow a user to enter many details relating to any particular contact. In the illustrated GUI 102, the illustrated contact information 126 includes two telephone number fields 132, a ringtone designation field 134, an email address field 136, and a physical address field 138. The illustrated contact information 126 also includes an option 124 for selecting whether the contact designated by the contact information 126 will be able to access the user's shared user data 44.

Figure 6:
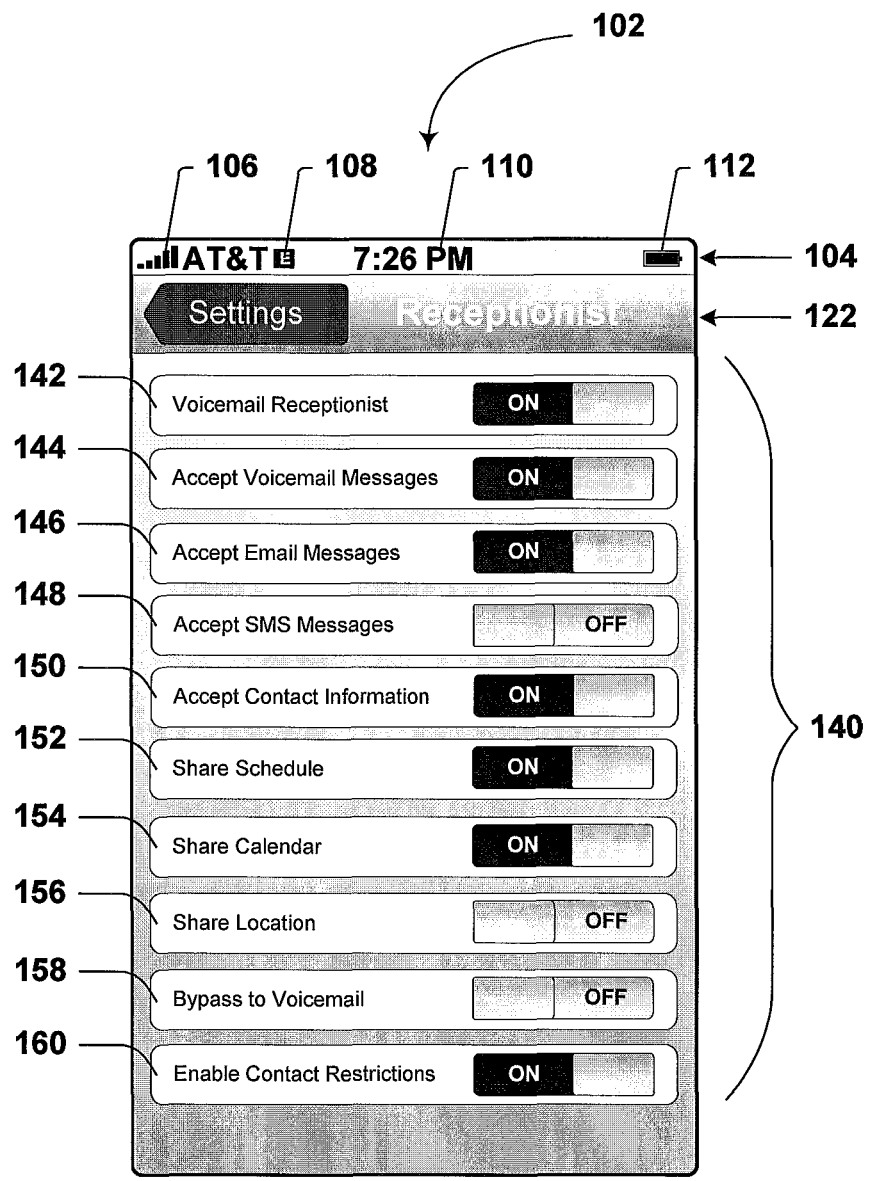
FIG. 6 illustrates an exemplary graphical user interface for allowing a user to configure voicemail receptionist system preferences, according to an exemplary embodiment of the present disclosure.

Another exemplary GUI 102 image is illustrated in FIG. 6. In FIG. 6, a VMR preferences interface 140 is illustrated. In the illustrated exemplary GUI 102, various options relating to the user's VMR user data 44 can be provided to a user for customization. For example, the illustrated preferences interface 140 allows a user to toggle various options, including a master toggle 142 for toggling on or off the VMRS functionality, a toggle 144 for toggling on or off acceptance of voicemail messages through the VMRS 30, a toggle 146 for toggling on or off acceptance of email messages through the VMRS 30, a toggle 148 for toggling on or off acceptance of SMS messages through the VMRS 30, a toggle 150 for toggling on or off acceptance of calling party contact information through the VMRS 30, a toggle 152 for toggling on or off the share schedule feature of the VMRS 30, a toggle 154 for toggling on or off the share calendar feature of the VMRS 30, a toggle 156 for toggling on or off the share location feature of the VMRS 30, a toggle 158 for toggling on or off the bypass to voicemail feature of the VMRS 30, and a toggle 160 for enabling or disabling the feature for customizing VMR settings to specific contacts in the user's contact list. Other options, for example, enabling realtime monitoring of VMRS 30 activity, enabling video messaging, enabling forwarding to websites, enabling busy phone redial, enabling calling party hold, and the like, are contemplated, but are not illustrated for the sake of brevity.

In the illustrated preferences interface 140, acceptance of SMS messages 148, location sharing 156, and the bypass option 158 are illustrated as toggled to "off." All other options of the VMR application are illustrated as toggled to "on." It will be appreciated that some users may wish to toggle certain features of the VMR application on or off. For example, some users are limited to a certain number of SMS messages per billing cycle, after which a fee applies to each transmitted or received SMS message. These and other considerations may prompt some users to toggle "off" the SMS acceptance option 144, as illustrated in FIG. 5. Additionally, or in the alternative, the SMS acceptance option 144, and/or other options, can be automatically adjusted upon receipt of account status indicating that use of some service or option is nearing the capacity paid for, e.g., obtaining data usage, call time, text message counts, and the like, using STAR SERVICE. Furthermore, privacy concerns or other issues may prompt some users to disable the share location feature 152 of the VMRS 30. In one embodiment, a user can disable the share location feature 152 of the VMRS 30 for all anonymous calls, and/or for particular contacts, numbers, locations, and the like. Various concerns and or motivations can inform the decisions made by the user in choosing whether to toggle on or off any or all available options of the VMRS 30.

Figure 7:
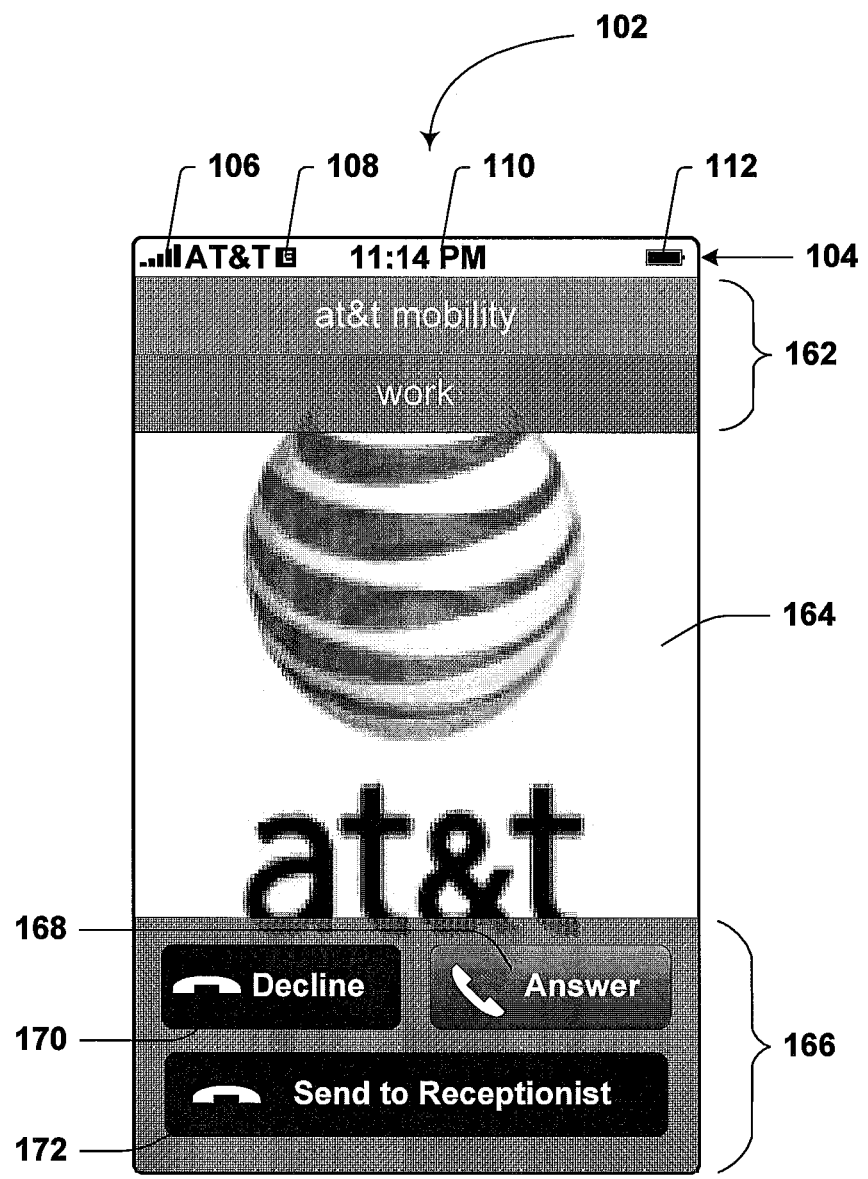
FIG. 7 illustrates an exemplary graphical user interface for allowing a user to send an incoming call to a voicemail receptionist system, according to an exemplary embodiment of the present disclosure.

Turning now to FIG. 7, a representative called-party view of a call status GUI 102 is illustrated according to an exemplary embodiment of the present disclosure. The illustrated GUI 102 includes a device status section 104, a calling party information section 162, a calling party representative graphic 164, and a menu section 166. The illustrated menu 166 includes an option 168 to answer the incoming call, an option 170 to decline the incoming call, and an option 172 to send the call to the VMRS 30. If the user selects the option 168 to answer the incoming call, the call can be connected with the device. If the user selects the option 170 to decline the incoming call, the call can be handled according to device preferences. For example, some devices include a decline command, or substantially equivalent functionality, whereby the call is handled as if the call is not answered. In the case of a device with VMRS support, the call can be forwarded to a standard voicemail system, terminated, provided with a busy signal, forwarded to a different telephone number, passed to a paging system, or forwarded to a VMRS 30, depending upon preferences set by the user, the device, the network, or another authorized party. If the user selects the option 172 to send the call to the VMRS 30, the call can be sent to the VMRS 30 and handled according to the user's user data 44 and the calling party data, as explained above with reference to FIG. 2.

Figure 8:
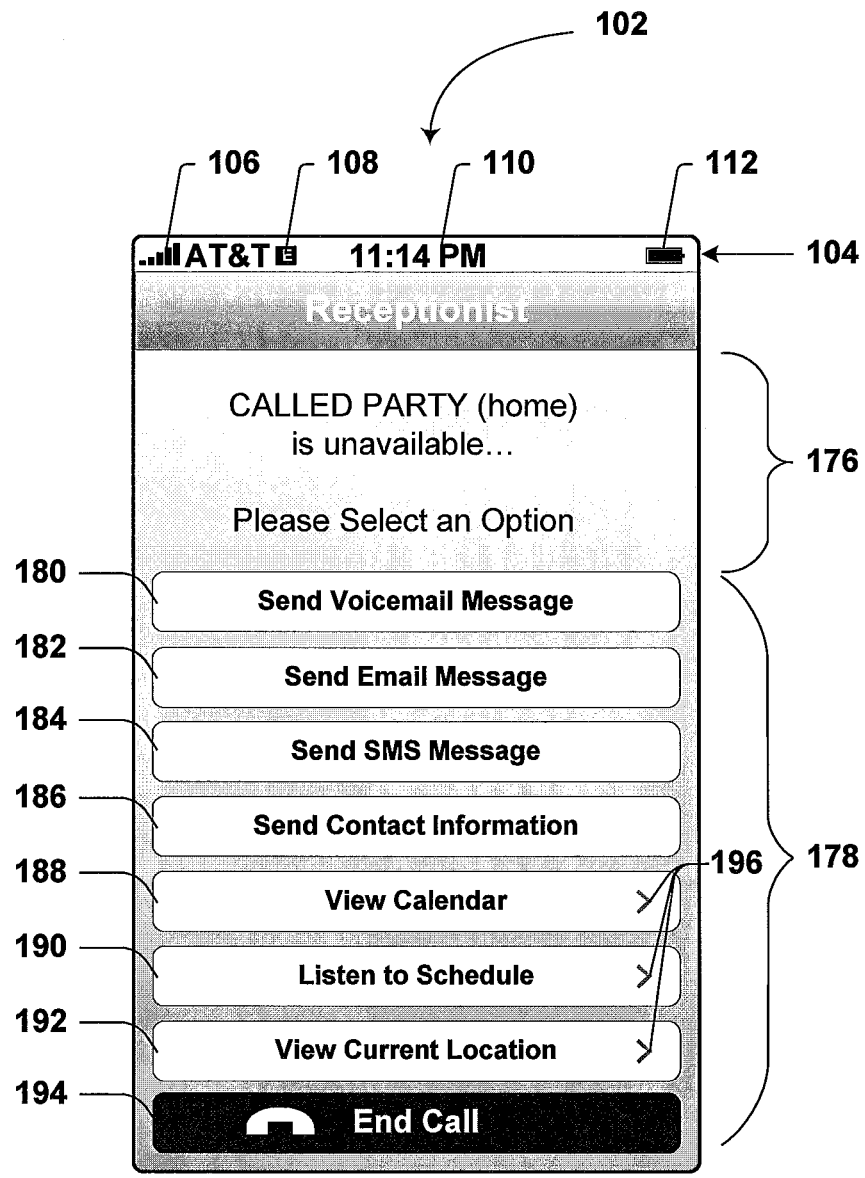
FIG. 8 illustrates an exemplary graphical user interface for allowing a calling party to interface with a voicemail receptionist system, according to an exemplary embodiment of the present disclosure.

Turning now to FIG. 8, a representative calling-party view of a voicemail receptionist GUI 102 is illustrated according to an exemplary embodiment of the present disclosure. The illustrated GUI 102 includes a device status section 104, and a call status section 176. The call status section 176 can provide the user of the device with information, for example, information relating to a present communication. In the illustrated embodiment, the call status section 176 indicates to the user that the called party is unavailable, and that the call has been forwarded to a VMRS 30. As explained above with reference to FIG. 7, a called party may be unavailable for many reasons, for example, the ringer is turned off or broken, in which case the user does not know that a call has been received, the user and the user's device may be out of communication range or busy. Similarly, the user may be using the device when the call is received, may decline the call, may send the call to the receptionist, or may not pick up the call for another reason. Regardless of the reason for the call being forwarded to the VMRS 30, as will be explained in detail below, the VMRS 30 can forward to the calling party device options for displaying to a user in a menu 178. In the illustrated embodiment, the user can choose to send a voicemail message 180, send an email message 182, send an SMS message 184, send contact information 186, view the user's calendar 188, listen to the user's schedule 190, view the user's current location 192, or end the current call 194. Some or all of the options on the menu 178 can include a submenu, access to which can be gained by pressing or selecting the submenu selection option 196. For example, the illustrated "View Calendar" option 188 includes a submenu selection option 196. When the submenu selection option 196 is selected by a calling party, a new submenu can be presented to the calling party. The submenu can include an option to select a specific view, e.g., a day, week, or month, or to show certain types of time, e.g., free time, time at work, and the like. A configured calendar can be presented to the calling party in accordance with selected options or default options. Additional options can be presented with the menu, for example, an option to leave a voice message, send a text message, view location, and the like, can be provided to a calling party since such functionality can be useful once a user's calendar has been viewed. Additionally, or in the alternative, the submenu can present a calendar with various options without the need for configuring the presented view. Other options can also include submenus, and the submenus can be presented using audio menus instead of the illustrated graphical user interface.

Figure 9:
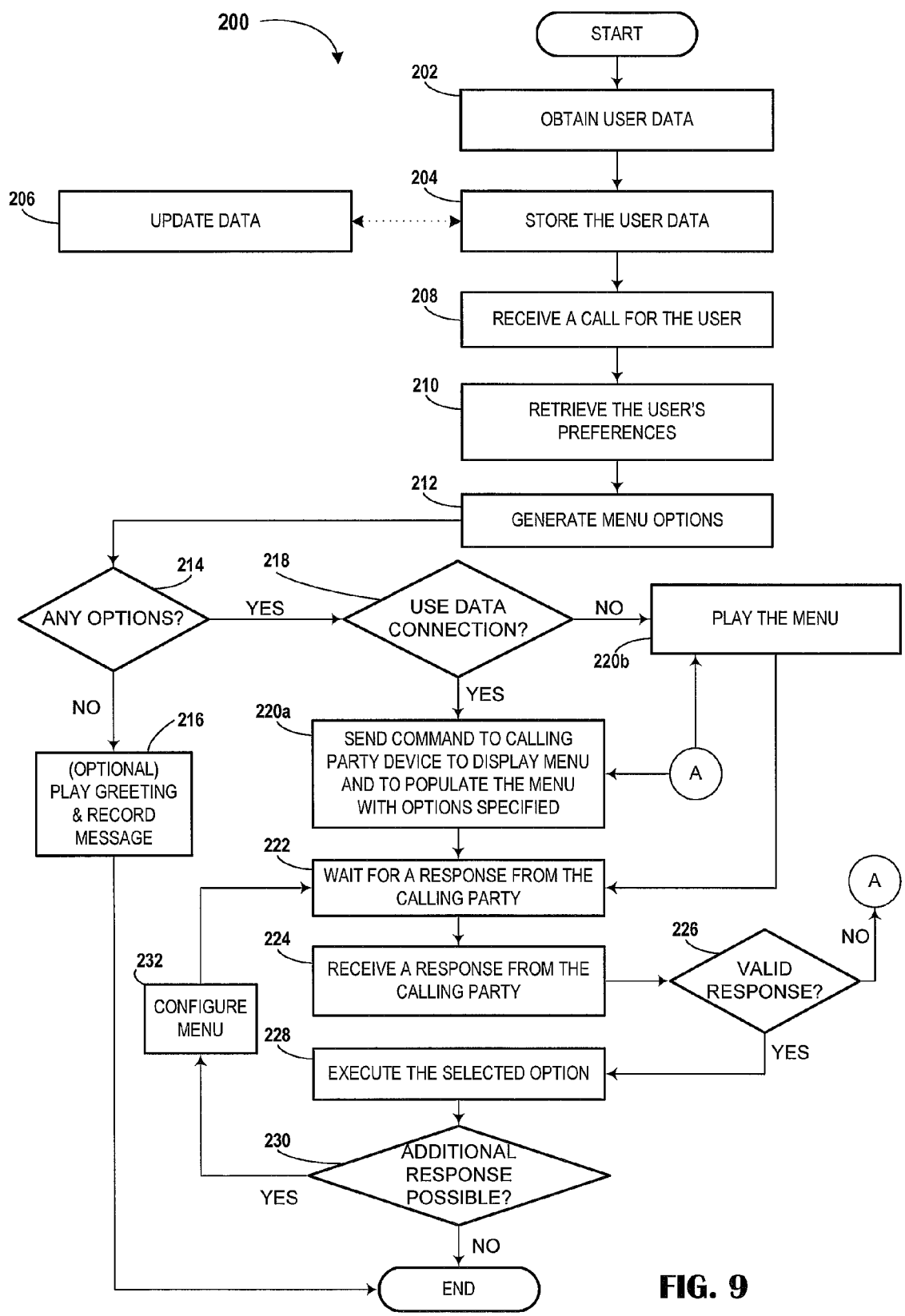
FIG. 9 schematically illustrates a method for handling a communication with a voicemail receptionist system, according to an exemplary embodiment of the present disclosure.

Turning now to FIG. 9, an exemplary method 200 for handling an incoming communication at a VMRS 30 is illustrated. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. Additionally, it should be appreciated that a phone call can end at any time for a number or reasons. As such, there is no requirement that the method 200 be performed in its entirety. Some or all steps of this process, and/or substantially equivalent steps, can be performed by execution of computer-readable instructions included on a computer readable medium. Furthermore, it must be understood that the word "handle," and all variants thereof, as used in the description and in the claims, refers to the determination and/or implementation, by the VMRS 30, of what functionality to provide a calling party, how to implement that functionality, and what information the determination is based upon.

The illustrated method 200 begins and flows to block 202, wherein the VMRS 30 obtains user data 44 relating to a user of the VMRS 30. The user data 44 can be obtained in a number of ways. For example, in some embodiments, user data 44 is configured on a mobile device 18 and "pulled" or "pushed" to the VMRS 30 from the device 18 by a network component. For example, a user can customize an application on the device, on the web, or on a sync device such as a PC, for example. Application data can be synced with the mobile device and "pulled" or "pushed" from the device. Alternatively, data can be synced with the VMRS 30 by a node on the Internet 14, by a sync device, or any other appropriate device. A "pull" operation, as used herein, can include a query from the network to the device for new data, and the transmission from the device to the network of the data. In other embodiments, user data 44 is configured via an input interface, for example, a PC 20, laptop 22, or portable device 24 in operable connection with the Internet 14, or a mobile device 18 in operable connection with the Internet 14 via a network, e.g., the cellular network 12. In other embodiments, user data 44 is configured and "pushed" to the network 12 by the user or the user's device. A "push" operation, as used herein, includes a device 18 transmitting data to the network. A "push" operation can be initiated by a user, scheduled by the user or device, or can automatically occur when data is updated, for example.

Regardless of how the user data 44 is obtained by the VMRS 30, the user data can be stored in a VMRS memory 38, as shown at block 204. As illustrated by block 206, the user data 44 stored in the VMRS memory 38 can be updated at any time, for example, by a sync operation similar to the sync operation described above. For example, the user data 44 can be updated periodically, on demand, upon changes, or based upon any desired interval or trigger event. In still other embodiments, user data 44 can be updated periodically by syncing the user data 44 with one or more user devices. Any changes to the user data 44 can be saved in the VMRS memory 38, as illustrated at block 204. It will be appreciated that the exchange, saving, and/or updating of user data 44 can occur many times before the illustrated method flows to the next block. In some embodiments, block 206 corresponds to a starting position for the method 200, and blocks 202-204 correspond to a VMRS setup method.

At any time, as shown in block 208, the VMRS 30 can receive a call for a user. Although the process for delivering a call to the VMRS 30 will not be described in detail, it should be appreciated that a call can be forwarded to the VMRS 30 by a network node when the called party does not answer, for example. Alternatively, the VMRS 30 can effectively intercept all calls by configuring the network to deliver all calls directly to the VMRS 30. Alternatively, the device can forward calls to the VMRS 30, for example, by using a call forward feature. Regardless of how a call arrives at the VMRS 30, the calling party's call data can also be delivered to the VMRS 30.

As illustrated in block 210, the VMRS 30 can use the user data 44 for the called party, and the call data to retrieve various data from the VMRS memory 38, a network node, and/or the Internet 14. For example, the VMRS 30 can retrieve data relating to the user's, i.e., the called party's, general preferences, greetings, announcements, schedule, calendar data, network data, location data, and the like. Furthermore, the VMRS 30 can correlate the call data relating to the calling party to the user data 44, whereby any specific preferences relating to the calling party can be retrieved. For example, if a user has blocked certain data from being accessible by a calling party, the VMRS 30 can determine this user preference by correlating the call data and the user data, for example. It should be noted that portions of data can be retrieved at various times, depending upon how the VMRS 30 is implemented by any particular user, network, provider, or the like. For example, the VMRS 30 may first determine what menu options should be provided before retrieving data relating thereto. Additionally, or in the alternative, the VMRS 30 can determine that a calling party cannot operate a data session, in which case the VMRS 30 will only need to get data need for a voice-driven embodiment of the VMRS 30.

In block 212 of the illustrated method 200, the VMRS 30 uses the retrieved user data 44, and any correlations between the user data 44 and the call data, to generate menu options for the calling party. For example, if the user has decided to share his or her calendar data 50 with calling parties, the VMRS 30 can include a "View Calendar" option in the list of menu options. The calling party can have access to the "View Calendar" option, for example, as a graphical menu choice, as illustrated by the option 188 in FIG. 8. If the user has decided to share location data 48, the VMRS 30 can add a "View Current Location" option to the list of options, and provide the calling party with an option to "View Current Location," as illustrated by the option 192 in FIG. 8. Similarly, if a user has decided to allow text messages to be sent from the VMRS 30, then the VMRS 30 can include a menu option to send a text message, as illustrated by the option 184 in FIG. 8. Similar decisions can be made relating to each possible menu option and whether or not to include each possible menu option.

At block 214, the VMRS 30 can determine if there are any options available for the calling party. In some instances, the VMRS 30 can determine that no data is to be shared with the calling party. For example, a user may decide to block the calling party from accessing any functionality of the VMRS 30 relating to the user. Alternatively, the user may not have updated the VMRS 30 with any user data 44. Regardless of why there are no menu options, the VMRS 30 can play the user's greeting and record a voicemail message, as illustrated in block 216. Alternatively, if there is no VMRS functionality needed, the call can be forwarded to a standard voicemail system to remove unnecessary data transfer from the VMRS 30. After the call is forwarded out of the VMRS network, handled by the VMRS 30, or handled by a standard voicemail system, the method 200 can end. It will also be appreciated that a user can disable the accept voicemail messages option for a particular calling party, or for all calling parties. Accordingly, if there are no available options for a calling party, the method can simply end without any other action, though a recording can be played for the calling party, if desired.

Returning now to decision block 214, if the VMRS 30 determines that there are menu options available, the method can proceed to block 218, wherein the VMRS 30 determines if the VMR functionality should be sent to the device using a data connection, a voice connection, or both. A user may prefer using a data connection, a voice connection, or both. For example, sending data to a device to enable a user to view a called-party's calendar may require the receipt of packet data at a calling party's device. If the calling party's device does not support simultaneous voice and data communication, for example, the voice communication can be terminated and a data session can be opened to enable the device to use the data-based functionality of the VMRS 30. Additionally, a user may prefer utilizing a data session for some or all of the VMRS functionality due to billing considerations, or to use extra or enhanced features for a GUI, for example. In any case, the VMRS 30 can inform a user, or the user's device, that a data session can be commenced to use some or all functionality of the VMRS 30. In some embodiments, the data session can be almost immediately opened so there appears to be little, if any, perceived delay between terminating the voice communication and opening the data communication. Additionally, the VMRS 30 can operate as a feature that is delivered to a mobile device 18 exclusively though a data session. In such an embodiment, the recordings, greetings, announcements, and the like, can be provided to a calling party as streaming audio or video. Some or all data can be cached in a calling party device and updated only as needed. Such an embodiment may have particular usefulness for users with unlimited data plans and/or the inability to open simultaneous voice and data sessions. In any embodiment, voice and/or data usage can be billed on a post-paid or a pre-paid basis, or all VMRS functionality can be delivered to a device as a bundled package.

Aside from a user's preferences, the decision whether to use data, voice, or both to deliver VMRS functionality can be based on a number of factors. For example, the VMRS 30 may determine that the calling party can open a data session while the call is active. In such a case, the VMRS 30 can send some or all of the VMR functionality using a data connection, as represented by block 220a. It will be appreciated that it may be desirable to deliver some or all of the VMRS functionality using a voice connection instead of, or in addition to, the data connection. For example, the VMRS 30 may determine that the device cannot use data while on a voice call. In such a case, the VMRS 30 can use a voice/keypad driven menu system, as illustrated at block 220b, or can instruct the device to terminate the call and initiate a data session. For example, if the calling party is using a mobile device, the cellular network 12 can use known data to determine if a data session is available. The known data can include, but is not limited to, the network with which the mobile device is registered, the IMEI of the device, the user's subscription or service plan, or other known or ascertainable data. If the calling party device is not a mobile device, the VMRS 30 can use the calling party's call data, e.g., the phone number or IP address of the calling party, to determine if the calling party device supports data and/or voice transfer. If the calling party device does not support data transfer, or if the VMRS 30 is unable to determine if the calling party device supports data transfer, the method 200 can flow to block 220b, wherein the VMRS functionality can be provided using recordings and user input via voice and/or keypad DTMF tones.

As illustrated in block 220b, the VMRS 30, can play a user's greetings, announcements, or the like, and can play a menu for the calling party that includes one or more options selectable by a voice command, a DTMF tone, or the like, e.g., "press or say '1' to leave a message, press or say '2' to send a text message, press or say '3' to hear the user's schedule," and the like. The VMRS 30 can wait for a response from the calling party, as illustrated in block 222.

Although the illustrated method 200 shows block 222 occurring after 220a, it will be appreciated that some menu systems allow a user to input a command to choose a menu option at any time within a menu, and that some systems restrict a user from choosing a menu option until all menu options have been played. It will be appreciated that these and other possibilities are not easily illustrated simultaneously, but are included in the scope of the appended claims.

Returning now to the decision block 218, if the VMRS 30 determines that the calling party device can support data transfer the method 200 flows to block 220a. In block 220a, the VMRS 30 can format and send a command to the calling party device to display the VMRS menu. The command to display the VMRS menu can include a list of the options to be displayed to the calling party. The command will be understood by the calling party's device, and/or a VMR application residing on the device, and can be used to command the calling party device to display an option menu, an example of which is illustrated in FIG. 8 above. The method 200 can flow to block 222, wherein the VMRS 30 waits for a response from the calling party.

As illustrated in block 224, the VMRS 30 can receive a response from the calling party. As explained above, the calling party's response can be transferred to the VMRS 30 over one or more data connections, one or more voice connections, or both. As illustrated at block 226, the VMRS 30 can examine the response received and validate the response to determine if the response entered corresponds to a choice offered to the calling party and/or if the data needed to execute the response is available. If the response entered by the calling party is executable, the method 200 can flow to block 228. If the response entered by the calling party does not correspond to an available option, or if the data is not available, the method 200 can return to block 220a or 220b, as illustrated. It will be appreciated that while the process flows back to block 220a or 220b, the VMRS 30 can inform the calling party that the response entered is not available and/or can generate a new menu to present to the calling party (neither of which are illustrated).

As illustrated in block 228, the VMRS 30 can execute a validated response. It will be appreciated that the validation described above with respect to block 226 can occur during or after attempted execution of the received response. Execution of the response can include a number of routines, subroutines, and/or actions taken by a number of servers, nodes, applications, programs, and the like. For example, if the calling party is communicating with the VMRS 30 over a voice connection, then selection by the calling party of the "Send a Text Message" can require entry by the calling party of a message in numeric or alpha-numeric characters using, for example, a telephone keypad or voice commands. In one embodiment, the calling party can record a spoken message and the VMRS 30 can convert the spoken message to text using a voice to text application. The converted message can be spoken back to the calling party to ensure the message was recorded correctly. Additionally, or in the alternative, a calling party can send a text message using, for example, the telephone keypad to spell the words of the message. Similar verification can be used to ensure the message is taken correctly. Additionally, or in the alternative, the text message can include a phone number entered, for example, using the telephone keypad or voice commands. A recorded message can also be sent to the user as an audio file that is embedded or attached to an email or MMS message. If the user selects the "View Current Location" option, the VMRS 30 can provide location information. The location information can be queried from, for example, the user's device, a location server, or using triangulation, for example. The location information can be obtained at any time, or can be updated when the option is selected. Other selected options can require other actions taken by the VMRS 30. For example, selecting an option to leave a voicemail message can require playing a recorded greeting or announcement for the calling party. Requesting the "Listen to Schedule" option can include querying the user's device, obtaining the user's calendar data 50, or retrieving a schedule recording. Other options can prompt the VMRS 30 to take other actions, though not described here in detail. The method 200 can flow to block 230.

As illustrated in block 230, the VMRS 30 can determine if another response is possible. For example, if the calling party chooses to view the user's calendar, listen to the user's schedule, or view current location, the VMRS 30 may be able to accept a second response after executing the first response. The calling party may determine, after listening to a schedule or viewing a calendar, that a message should or should not be left for the user. The VMRS 30 can provide such options to the calling party, if desired, and can, therefore, accept a second or other additional response. If the VMRS 30 determines that no second response is possible, the call can be ended and the method 200 can end. If the VMRS 30 determines that a second response is possible, the method 200 can flow to block 232, wherein the VMRS 30 can configure a second menu and return to block 222 to wait for a second response from the calling party. Steps 220a-232 can be iterated until no further response is available or entered by the calling party. When there is no second response available or entered by a calling party, the method 200 ends.

It should be appreciated that a call being handled by the VMRS 30 can be moved, at any time, from and between one or more voice connections to one or more data connections, or combinations thereof. It should also be appreciated that a call being handled by the VMRS 30 can be ended at any time, for example, by a calling party terminating the call or the call being terminated. A call can be terminated purposefully, or inadvertently, for example, by leaving a coverage area, losing power at a device, and the like. In any case, the method 200 is exemplary only and need not be completed for any particular communication.

Figure 10:
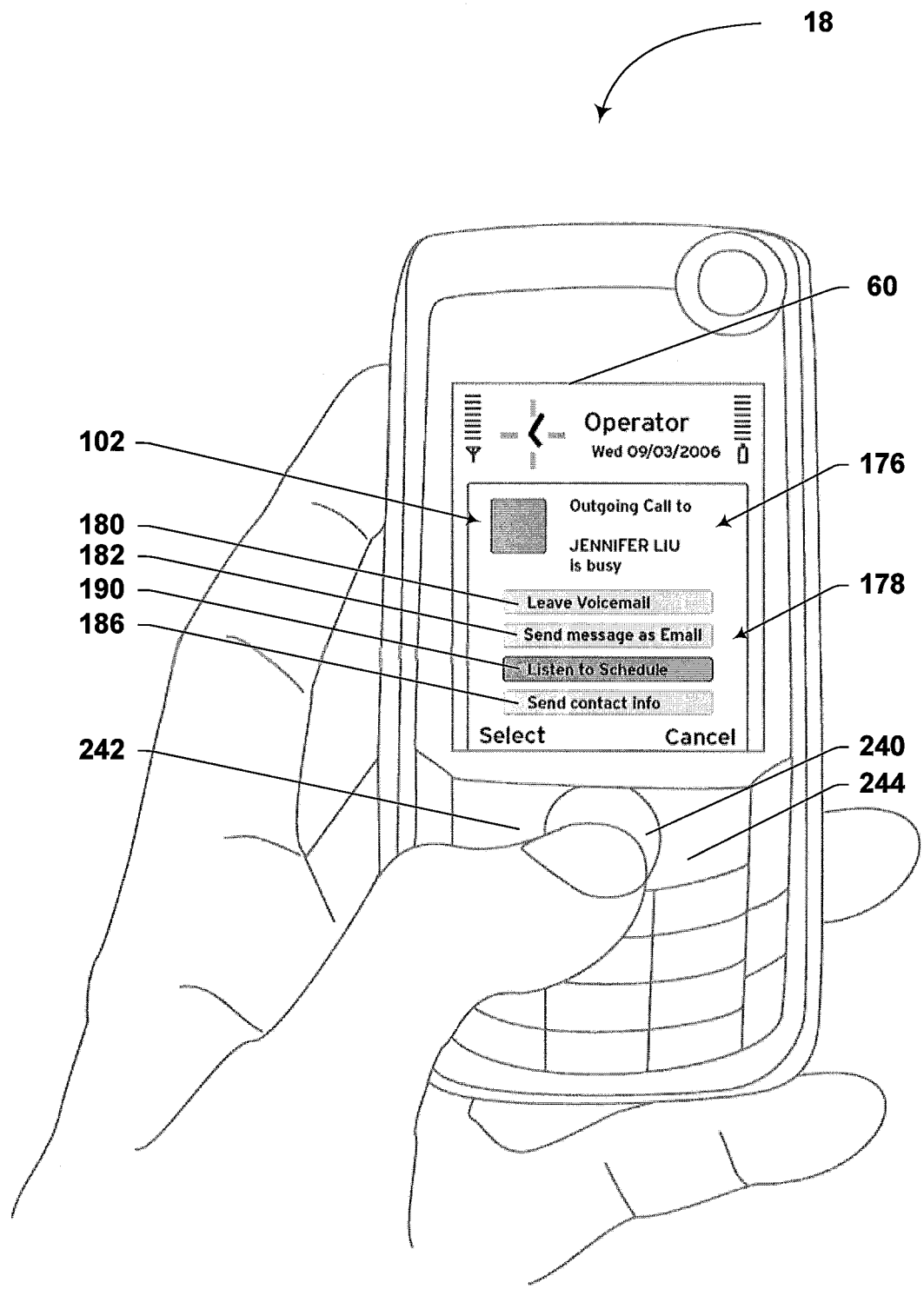
FIG. 10 illustrates an exemplary graphical user interface for providing a voicemail receptionist feature to a calling party, according to an alternative embodiment of the present disclosure.

Turning now to FIG. 10, a graphical user interface for providing a calling party with a voicemail receptionist feature is illustrated, according to an alternative embodiment of the present disclosure. As shown, a device 18 includes a display 60. The display 60 is currently displaying a GUI 102 for providing the calling party with VMRS functionality. The GUI 102 includes a call status section 176 and a menu section 178, similar to the GUI 102 illustrated in FIG. 8. The menu section 178 includes an option 180 to send a voicemail message, an option 182 to send an email message, an option 190 to listen to the user's schedule, and an option 186 to send contact information to the user. It will be appreciated that the contact information can be associated with any party, including, but not limited to, the calling party. The illustrated device 18 includes a selector switch 240 and soft keys 242, 244 for selecting the desired option 180, 182, 186, 190.

While the foregoing description has described the VMRS 30 as residing as an application on a communications network 10 and as software on a device 18, it will be appreciated that, as mentioned above, a device 18 can include the user data and the VMRA 42, both of which can reside in a memory of the device 18. As such, two devices with VMR support can "talk to each other" to provide the functionality needed for the VMRS 30. It will be appreciated that this embodiment can provide benefits to the user, but that this embodiment can also require more data and/or voice usage by the called party device 18. User preferences can be used to determine whether the VMRS 30 functionality should be employed at the device 18 or at the communications network 10.

It must be understood that the illustrated GUIs are exemplary only and other contemplated user interfaces, screen layouts, selection methods, and the like are contemplated, including an embodiment of the VMRS 30 that does not provide a GUI at the user's device, the calling party's device, or either device. Furthermore, a selection can be made using various embodiments of softkeys and/or key selections on a mobile or stationary telephone keypad, for example, and is not limited to the illustrated GUI. Additional and/or alternative selector switches and joysticks can be used to select a desired option or icon corresponding to a desired option. Input methods can also include touch screens or voice commands. Any desired screen layout or format can be used, including plain text and icons, for example.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method comprising:
receiving, by a server comprising a processor, a communication from a wireless communications device associated with a calling party, the communication directed to a user;
retrieving, by the processor, user data associated with the user, wherein the user data comprises user preferences and calendar data;
generating, by the processor, menu options for the calling party based on the user data associated with the user, wherein the menu options comprise a first menu option allowing the calling party to access the calendar data associated with the user and a second menu option allowing the calling party to listen to a schedule associated with the user, wherein the calendar data comprises data indicating at least one of an appointment associated with the user, free time associated with the user, busy time associated with the user, or vacation time associated with the user; and
transmitting, by the server comprising the processor, the menu options to the wireless communications device associated with the calling party for display at the wireless communications device, wherein at least a portion of the calendar data is provided to the calling party in response to a selection of the first menu option.

2. The method of claim 1, wherein the user data further comprises location data, wherein the menu options further comprise a third menu option allowing the calling party to access location information associated with the user, and wherein at least a portion of the location data is provided to the calling party in response to a selection of the third menu option.

3. The method of claim 1, wherein the user data further comprises account data associated with the user, and wherein the method further comprises adjusting, by the processor, at least a portion of the menu options provided to the calling party based on the account data associated with the user.

4. The method of claim 1, wherein the communication from the calling party to the user is a voice communication, and wherein the method further comprises:
receiving call data associated with the calling party;
determining, based on the call data associated with the calling party, that the wireless communications device associated with the calling party does not support simultaneous voice and data communications; and
in response to determining that the wireless communications device associated with the calling party does not support simultaneous voice and data communications,
terminating the voice communication,
initiating a data session with the wireless communications device of the calling party, and
transmitting the menu options to the wireless communications device of the calling party using the data session.

5. The method of claim 1, wherein the menu options further comprise a third menu option allowing the calling party to provide contact information associated with the calling party to the user.

6. The method of claim 1, further comprising:
receiving a response from the calling party;
determining whether the response from the calling party corresponds to one of the menu options transmitted to the wireless communications device associated with the calling party; and
if the response does not correspond to one of the menu options transmitted to the wireless communications device associated with the calling party, informing the calling party that the response is unavailable.

7. The method of claim 1, wherein the menu options further comprise a third menu option allowing the calling party to send a voicemail message to the user, a fourth menu option allowing the calling party to send an email message to the user, and a fifth menu option allowing the calling party to send a short message service message to the user.

8. A system comprising:
a processor; and
a memory storing instructions that, when executed by the processor, cause the processor to perform operations comprising:
retrieving, in response to receiving a communication from a wireless communications device associated with a calling party to a user, user data associated with the user, wherein the user data comprises user preferences and calendar data,
generating menu options for the calling party based on the user data associated with the user, wherein the menu options comprise a first menu option allowing the calling party to access the calendar data associated with the user and a second menu option allowing the calling party to listen to a schedule associated with the user, wherein the calendar data comprises data indicating at least one of an appointment associated with the user, with the user, and
transmitting the menu options to the wireless communications device associated with the calling party for display at the wireless communications device, wherein at least a portion of the calendar data is provided to the calling party in response to a selection of the first menu option.

9. The system of claim 7, wherein the user data further comprises location data, wherein the menu options further comprise a third menu option allowing the calling party to access location information associated with the user, and wherein at least a portion of the location data is provided to the calling party in response to a selection of the third menu option.

10. The system of claim 8, wherein the user data further comprises account data associated with the user, and wherein the operations further comprise adjusting at least a portion of the menu options provided to the calling party based on the account data associated with the user.

11. The system of claim 7, wherein the communication from the calling party to the user is a voice communication, and wherein the memory stores further instructions that, when executed by the processor, cause the processor to perform further operations comprising:
receiving call data associated with the calling party;
determining, based on the call data associated with the calling party, that the wireless communications device associated with the calling party does not support simultaneous voice and data communications; and
in response to determining that the wireless communications device associated with the calling party does not support simultaneous voice and data communications,
terminating the voice communication,
initiating a data session with the wireless communications device of the calling party, and
transmitting the menu options to the wireless communications device of the calling party using the data session.

12. The system of claim 7, wherein the menu options further comprise a third menu option allowing the calling party to provide contact information associated with the calling party to the user.

13. The system of claim 8, wherein the operations further comprise:
receiving a response from the calling party;
determining whether the response from the calling party corresponds to one of the menu options transmitted to the wireless communications device associated with the calling party;
if the response does not correspond to one of the menu options transmitted to the wireless communications device associated with the calling party, informing the calling party that the response is unavailable; and
if the response does correspond to one of the menu options, executing the response.

14. The system of claim 7, wherein the menu options further comprise a third menu option allowing the calling party to send a voicemail message to the user, a fourth menu option allowing the calling party to send an email message to the user, and a fifth menu option allowing the calling party to send a short message service message to the user.

15. A non-transitory computer-readable storage device storing instructions that, when executed by a processor, cause the processor to perform operations comprising:
retrieving, in response to receiving a communication from a wireless communications device associated with a calling party to a user, user data associated with the user, wherein the user data comprises user preferences and calendar data;
generating menu options for the calling party based on the user data associated with the user, wherein the menu options comprise a first menu option allowing the calling party to access the calendar data associated with the user and a second menu option allowing the calling party to listen to a schedule associated with the user, wherein the calendar data comprises data indicating at least one of an appointment associated with the user, free time associated with the user, busy time associated with the user, or vacation time associated with the user; and
transmitting the menu options to the wireless communications device associated with the calling party for display at the wireless communications device, wherein at least a portion of the calendar data is provided to the calling party in response to a selection of the first menu option.

16. The non-transitory computer-readable storage device of claim 15, wherein the user data further comprises location data, wherein the menu options further comprise a third menu option allowing the calling party to access location information associated with the user, and wherein at least a portion of the location data is provided to the calling party in response to a selection of the third menu option.

17. The non-transitory computer-readable storage device of claim 15, wherein the user data further comprises account data associated with the user, and wherein the operations further comprise adjusting at least a portion of the menu options provided to the calling party based on the account data associated with the user.

* * * * *